(12) United States Patent
Haley, III (10) Patent No.: US 6,884,342 B2
(45) Date of Patent: Apr. 26, 2005

(54) WASTEWATER TRICKLE TOWER BIOMEDIA STRANDS ARRANGEMENT

(75) Inventor: John W. Haley, III, Providence, RI (US)

(73) Assignee: BioProcess Technologies Ltd., Portsmouth, RI (US)

( * ) Notice: Subject to any disclaimer, the term of this patent is extended or adjusted under 35 U.S.C. 154(b) by 86 days.

(21) Appl. No.: 10/375,179

(22) Filed: Feb. 27, 2003

(65) Prior Publication Data

US 2003/0226804 A1 Dec. 11, 2003

Related U.S. Application Data

(60) Provisional application No. 60/360,483, filed on Feb. 28, 2002.

(51) Int. Cl.[7] .................................................. C02F 3/04
(52) U.S. Cl. ...................................... 210/150; 210/615
(58) Field of Search ................................ 210/150, 151, 210/615

(56) References Cited

U.S. PATENT DOCUMENTS

| | | | |
|---|---|---|---|
| 2,008,507 A | 7/1935 | Laughlin | |
| 2,308,866 A | 1/1943 | Dekema | |
| 3,231,490 A | * 1/1966 | Fry | ............................ 210/150 |
| 3,238,124 A | 3/1966 | Burton | |
| 3,275,147 A | 9/1966 | Gilde | |
| 3,835,039 A | * 9/1974 | Ciambrone | .................. 210/615 |
| 4,088,571 A | * 5/1978 | Helgesson | ................... 210/150 |
| 4,411,780 A | * 10/1983 | Suzuki et al. | ................ 210/150 |
| 4,422,930 A | 12/1983 | Hatanaka | |
| 4,451,362 A | 5/1984 | Spelsberg | |
| 5,397,474 A | 3/1995 | Henry | |
| 5,399,266 A | * 3/1995 | Hasegawa et al. | .......... 210/150 |
| 5,997,972 A | * 12/1999 | Basse | .......................... 210/615 |
| 6,241,889 B1 | * 6/2001 | Haley, III | ................... 210/150 |
| 6,274,035 B1 | * 8/2001 | Yuan et al. | .................. 210/150 |
| 6,319,407 B1 | * 11/2001 | Maatta et al. | ................ 210/150 |

* cited by examiner

Primary Examiner—Christopher Upton
(74) Attorney, Agent, or Firm—Wildman, Harrold, Allen & Dixon LLP (57) ABSTRACT

A wastewater trickle tower has at least one biomedia grate including pairs of upper hanger bars, pairs of lower hanger bars, and spaced-apart rows of biomedia strands, preferably looped cord strands, connecting the upper and lower hanger bars. Upper ends of the strands are secured between pairs of the upper hanger bars, and lower ends of the strands are secured between pairs of the lower hanger bars. A base receptacle to collect wastewater is disposed below the grate. The upper hanger bars are secured together as a unit, the lower hanger bars are secured together as a unit, and a tensioning arrangement is provide for tensioning the strands by influencing the upper and lower hanger bars apart.

23 Claims, 11 Drawing Sheets

WASTEWATER TRICKLE TOWER BIOMEDIA STRANDS ARRANGEMENT

CROSS-REFERENCE TO RELATED APPLICATION

This application claims the priority of U.S. Provisional patent application Ser. No. 60/360,483, filed Feb. 28, 2002.

FIELD OF THE INVENTION

This invention relates to the treatment of wastewater using one or more trickle towers employing biomedia. This invention particularly relates to the arrangement of strands of biomedia and the construction of biomedia filters formed thereby.

BACKGROUND OF THE INVENTION

With greater demands being placed on the treatment of wastewater by regulatory authorities, there has become a growing need for systems that will treat wastewater to a higher level of purity. This has also brought an increasing need for systems that are more versatile in design and can more readily be adapted to handle differing wastewater treatment requirements.

I have found that a trickle tower system employing strands of looped cord biomedia is more suited to handling today's increasing demands in wastewater treatment than the conventional systems currently in use. The initial approach of a looped cord biomedia trickle tower system is disclosed in my U.S. Pat. No. 6,241,889 published Jun. 5, 2001. While this tower system has been promising, and the general approach employed appears correct, further improvements and modifications are now desirable for more wide-spread adoption by industry and civil authorities.

SUMMARY OF THE INVENTION

This invention is concerned with improving and modifying the wastewater treatment process and apparatus disclosed in the above U.S. Pat. No. 6,241,889 the whole disclosure of which is hereby incorporated herein by reference.

This invention is also concerned with developing further approaches to trickle tower treating of wastewater. Some of these approaches are particularly advantageous with looped cord biomedia, and others are advantageous with other biomedia and other systems in addition to being applicable with looped cord biomedia.

This invention is particularly concerned with the mounting of strands of biomedia in a unit, and the incorporation of this unit, as a biomedia filter, into a wastewater trickle tower.

The invention is also concerned with improving the ease, flexibility, and cost of constructing wastewater trickle towers. At the same time, the invention is concerned with improving the efficiency and effectiveness of these trickle towers.

According to one aspect of the present invention, a wastewater treatment apparatus comprises a support structure having a base, a trickle tower supported by the support structure and containing biomedia, the biomedia being in the form of at least one grate having a plurality of hanger frames, each hanger frame containing a row of vertically extending strands. Each hanger frame has a pair of mutually connected upper hanger bars and a pair of mutually connected lower hanger bars, upper ends of the strands of a respective row being clamped between the upper bars and lower ends of these strands being clamped between the lower bars. The pairs of upper bars of the grate are connected together, the pairs of lower bars of the grate are connected together, the upper bars are suspended from the supporting structure, and the lower bars are anchored therebelow with the rows of strands being tensioned between the upper and lower bars.

The strands are preferably each formed as an individual discrete length, and may be formed as cut lengths.

Preferably, the strands are individual lengths of looped cord biomedia. The looped cord may be formed with at least some of the loops orientated or having a bias in one direction along the looped cord, and the strands themselves are then orientated with these orientated loops all orientated in the same direction, which may be upwardly opposite to the fall of wastewater down the trickle tower.

The grates may be anchored, and at the same time the strands adjustably tensioned, by adjusting bolts.

Spacing elements are preferably disposed between adjacent pairs of bars, and bolts employed to clamp the pairs of bars and the spacing elements together. At least one bolt may clamp all the pairs of upper bars together, and at least one bolt clamp all the pairs of lower bars together.

The upper pairs of bars are preferably rigidly connected together as a rigid unit. Similarly, the lower pairs of bars are preferably rigidly connected together as a rigid unit.

A sleeve may surround the grate, the sleeve having a rectangular horizontal cross-section and comprising flexible sheeting suspended from the support structure. Alternatively, or in addition, the grate may be surrounded by and supported by a structural casing, which may be free standing and comprise the support structure, the casing and the grate forming a filter unit.

According to a further aspect of the present invention, there is provided a biomedia filter unit for incorporation in a trickle tower wastewater treatment apparatus, the filter unit comprising a grate having a plurality of hanger frames, each hanger frame having a row of individual, spaced-apart biomedia strands. Each hanger frame comprises a pair of mutually connected upper hanger bars and a pair of mutually connected lower hanger bars, upper ends of the strands of a respective row being clamped between the upper bars, and lower ends of these strands being clamped between the lower bars. The pairs of upper bars of the grate are spaced apart and connected together, and the pairs of lower bars of the grate are also spaced apart and connected together.

The strands may comprise discrete lengths of looped cord whereby each strand is physically separate from the next strand. These discrete lengths may be cut lengths, for example, cut from a continuous warp. The cord preferably has at least some of its loops orientated in one direction, allowing all the lengths of cord to be disposed with all the so orientated loops orientated in the same direction.

The bars may be made of plastic material and glued together.

Each strand may have free ends protruding from the respective pairs of bars between which the ends are clamped. This occurs when a warp of the strands is laid out, then at least one of the pairs of bars clamped across the warp, followed by cutting the warp adjacent the bars. These ends may be heat treated to form enlarged melted ends drawn against the adjacent pair of hanger bars.

For transportation and storage, a collapsible version of the filter may conveniently be packaged in a box, one set of bars being disposed in the bottom of the box, and the other set of bars being disposed at the top of the box with the biomedia strands being collapsed and disposed between the two sets of bars.

Apart from this filter being readily transportable as a collapsed unit, it is also convenient to mount in a trickle tower, and can function with good efficiency in treating wastewater.

According to yet another aspect of the present invention, there is provided a wastewater trickle tower apparatus having at least one biomedia grate comprising upper hanger bars, lower hanger bars, and spaced-apart rows of looped cord biomedia strands connecting the upper and lower hanger bars. Upper ends of the strands are secured by the upper hanger bars, and lower ends of the strands are secured by the lower hanger bars. A base receptacle is disposed below the grate. The upper hanger bars are secured together as a unit, the lower hanger bars are secured together as a unit, and tensioning means is provided for tensioning the strands by influencing the upper and lower hanger bar units apart.

Other objects, features, and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or different Figures indicate like parts.

DETAILED DESCRIPTION OF THE PREFERRED EMBODIMENTS

Figure 1:
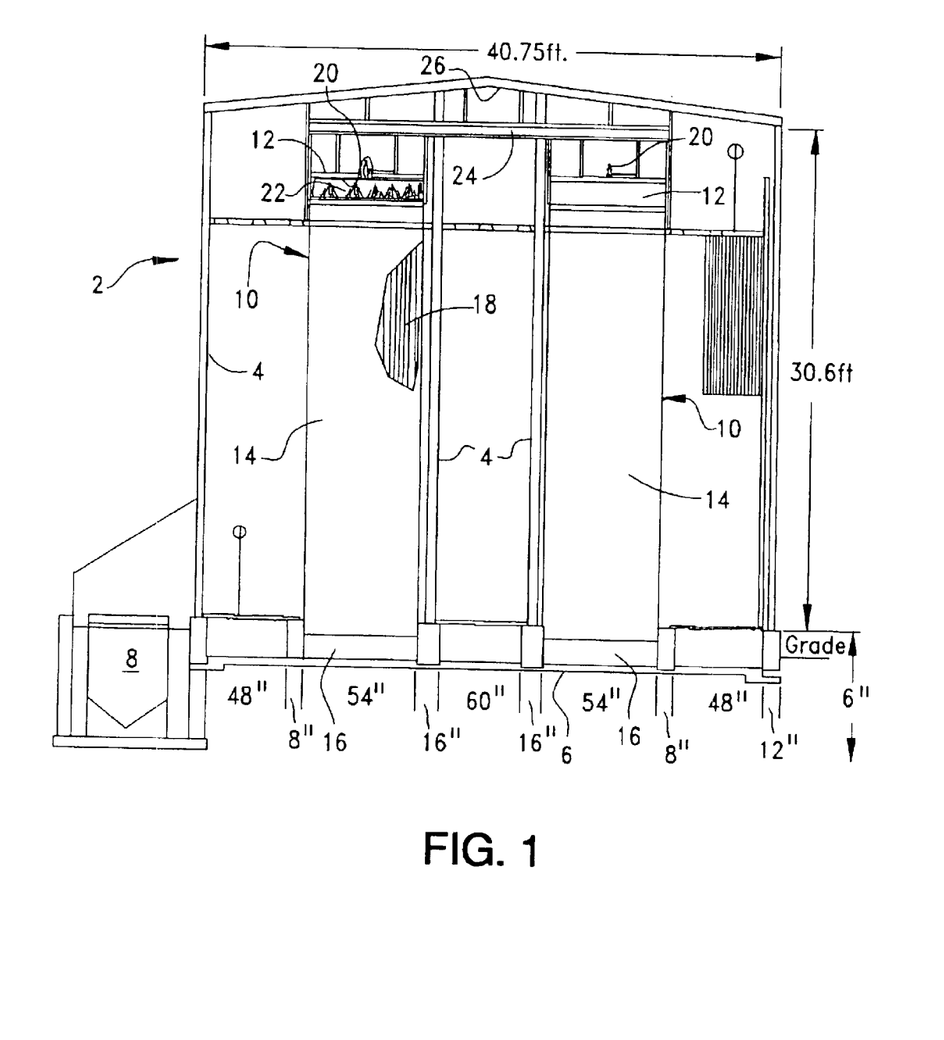
FIG. 1 is a schematic vertical section of a trickle tower wastewater treatment apparatus embodying the present invention.

FIG. 1 shows an exterior, weatherproof, steel building 2 having a support structure 4 erected on a concrete base 6, with a covered recirculation tank 8 outside the building. Two wastewater treatment cells 10 are shown. Each cell 10 has an upper closure hood 12, a flexible curtain 14 draped around the hood 12 and extending downwardly into a base receptacle 16 formed on the concrete base 6. Biomedia 18 is enclosed by the curtain 14, and a wastewater spraying or discharge system 20 is mounted inside the hood 12 above the biomedia, both as shown through broken away portions of the left cell 10. Wastewater 22 from the spraying system 20 flows down the biomedia 18 and drips into the base receptacle 16, illustrated as a base tray from which the partially treated wastewater flows to the recirculation tank 8 for recirculation to the spraying system 20 of the same or another cell. Of course, the base tray 16 could be constructed as a recirculation tank, so eliminating the outside recirculation tank 8. The hoods 12 are suspended by structural members 24, 26 supported by and forming part of the building structure 4, for example the roof rafters. The curtains 14 are attached and sealed to the outside of the hoods 12, and to the inside of the base receptacles 16.

Figure 2:
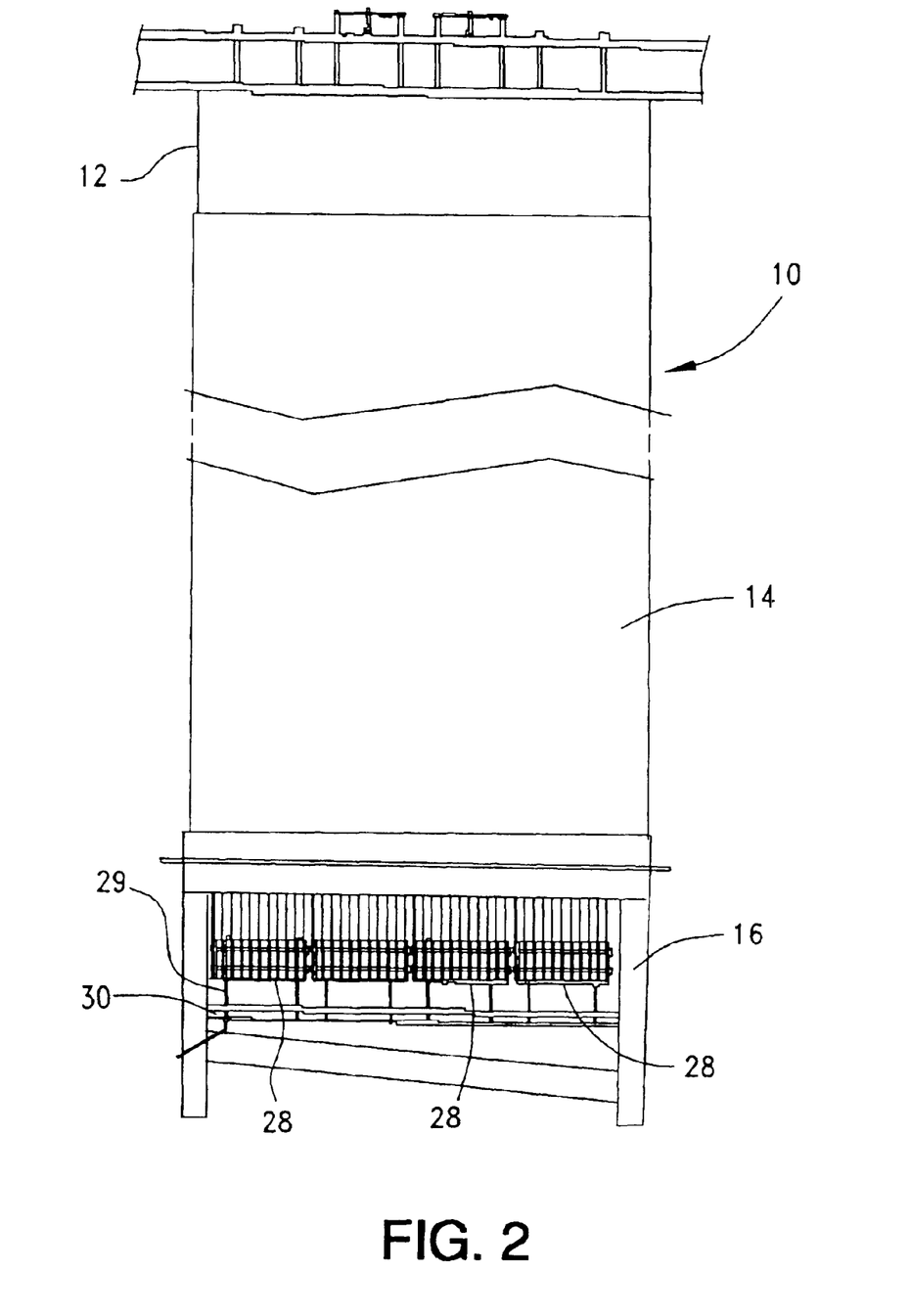
FIG. 2 is an elevational side view, with parts removed for clarity, of a single cell unit of the apparatus of FIG. 1.

FIG. 2 shows one of the cells 10 in side view, the curtain 14 surrounding and defining this cell, extending downwards from the outside of the hood 12 to the inside of the base receptacle 16. Although varies types of biomedia could be used inside the confines of the curtains 14, looped cord biomedia having looped continuous filaments is preferred, and preferably the looped cord biomedia is tensioned vertically. To show such a preferred arrangement, the side of the base receptacle 16 has been omitted to expose lower ends of four biomedia grates 28 (described in detail later) attached by adjustable tensioning bolts 29 to an anchor bar 30 extending horizontally across the base receptacle 16. These tensioning bolts 29 are a slip fit through holes in the anchor bar 30, to allow the bolts 29 to slip downwardly through the anchor bar 30, should any biomedia grate 28 lengthen and drop down a little in use due to the weight of the biomass forming on the biomedia strands of the grate. This prevents such strands from sagging in use, and further mitigates the possibility of biomass bridging between adjacent biomedia strands.

Figures 3, 4:
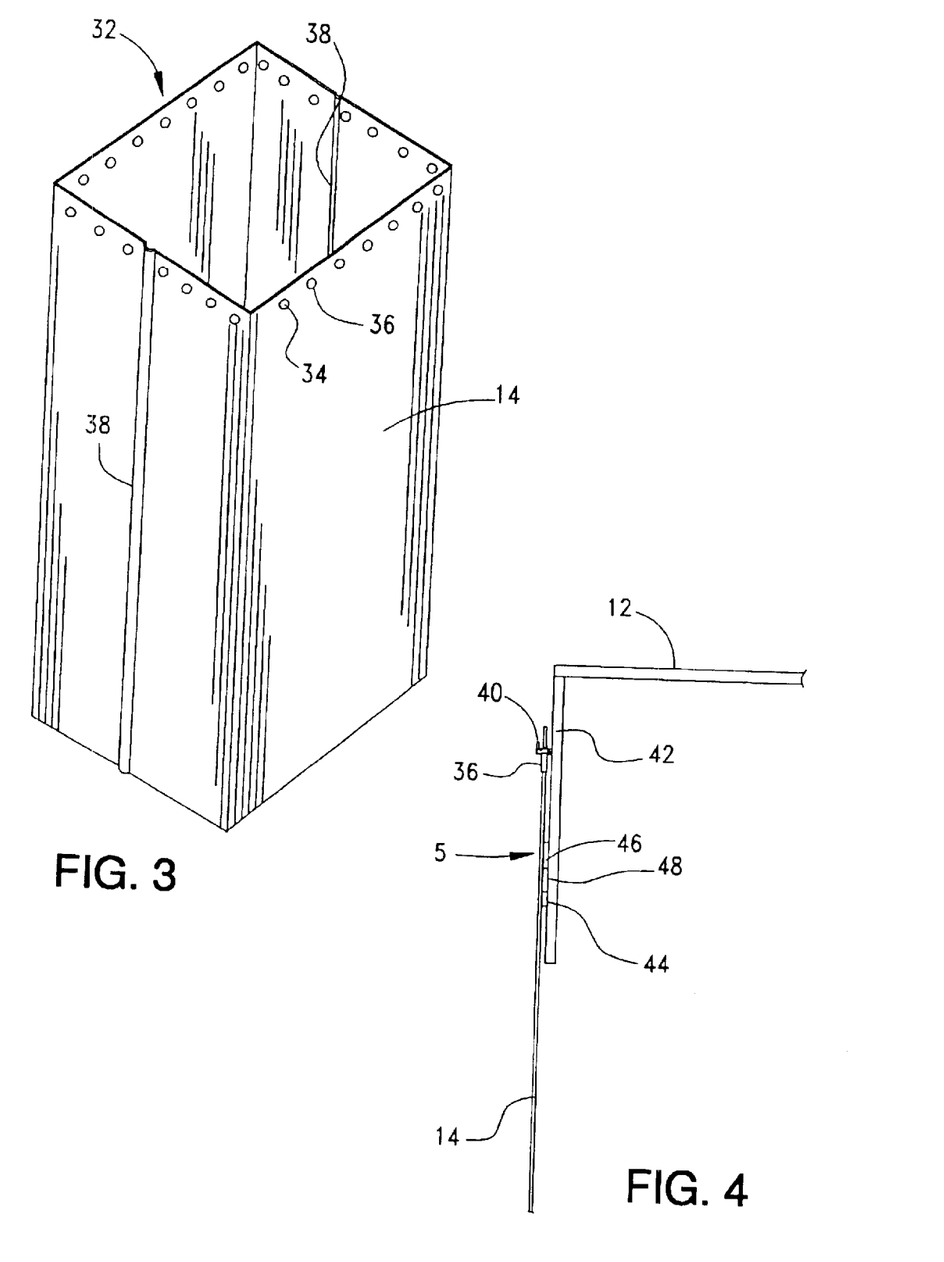
FIG. 3 is a diagrammatic perspective view of a curtain that surrounds one or more treatment cells in the apparatus of FIG. 1.
FIG. 4 is a partial vertical section illustrating the connection of the top of the curtain of FIG. 3 to a hood part of the apparatus of FIG. 1.

FIG. 3 illustrates in perspective view one of the curtains 14. It forms a tube-like casing, preferably made of flexible plastic sheeting, for example polyvinylchloride, polypropylene, etc. Due to the flexibility and deformability of the sheeting, the tube-like casing can have any required cross-sectional shape. As shown, it has a square cross-section 32; however, the cross-section may be rectangular, elliptical, circular, etc. In this way, the curtain 14 can be adapted to closely surround and define any shaped block of biomedia, whether solid biomedia, suspended strips, or looped cord. Around the top of the curtain is a series of small holes 34 reinforced by metal (preferably stainless steel) grommets 36. These holes are hooked over pegs extending from the hood (shown in FIGS. 4 and 5); this serves as an aid when mounting the curtain 14 around the hood 12, and it also provides physical support for the curtain 14 once mounted. Extending the full vertical length of the curtain 14 is at least one releasable fastener 38 closing an opening or slit in the curtain. Preferably, there are two, three, four or more such releasable fasteners 38, two being shown. These fasteners may comprise a standard type releasable zipper, preferably of plastic material, as used with outer coats such as Parkas, or may comprise any other type of releasable connection suitable around wastewater. Preferably, this fastener comprises inter-engaging looped and hook strips as sold under the trademark VELCRO. One function of the releasable fastener(s) is to facilitate assembly and mounting of the curtain 14 around the biomedia; this enables the biomedia to be assembled in place and then the curtain hung around the biomedia. Another function is to provide ready access to the biomedia, particularly for inspecting the condition of the biomedia in use, and for repairing or replacing the biomedia. Although the releasable fastener 38 preferably runs the full length of the curtain, one or more of these fasteners may extend only for a portion of the length of the curtain 14.

FIG. 4 shows the attachment of the top of the curtain 14 to the hood 12. One of the grommets 36 at the top curtain edge is engaged over an L-shaped peg or hook 40 mounted on the outside of the hood's downwardly extending sidewall 42. Below the peg 40 are two spaced-apart releasable hook and looped connections 44, 46 (i.e. two pairs of VELCRO connections). These connections extend all the way around the hood 12, and sealingly reinforce attachment of the top of the curtain 14 to the hood. Mounted on the hood between the two releasable connections 44, 46, is a sealing strip 48 of rubber or other gasket material, which also extends all around the hood 12. This sealing strip 48 is resiliently compressible, and presses against the inside of the curtain to ensure both a watertight and an airtight joint between the curtain 14 and the hood 12.

Figure 5:
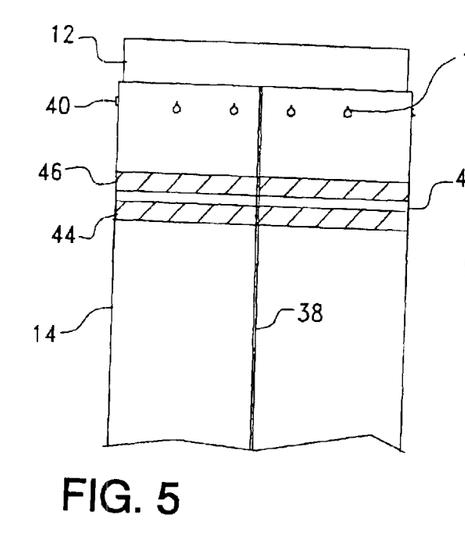
FIG. 5 is a partial schematic elevational view in the direction of the arrow 5 in FIG. 4.

FIG. 5 further illustrates the sealed connection of the upper portion of the curtain 14 to the hood 12. As can be seen, there is a series of L-shape pegs 40 spaced apart around the hood. The vertically spaced-apart VELCRO strip connections 44, 46 can be seen above and below the continuous horizontal sealing strip 48; however, these strip connections and sealing strip are covered and concealed by the curtain 14, but are shown through the curtain in FIG. 5 for the purpose of illustration.

Figure 6:
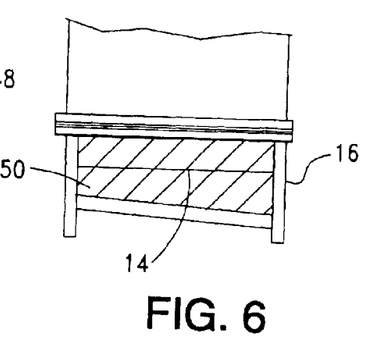
FIG. 6 is a partial schematic elevational view of the lower section of a cell of the apparatus of FIG. 1 showing the lower part of the curtain inside a base receptacle.

FIG. 6 illustrates the base receptacle 16 with a transparent sidewall 50, so as to show the bottom of the curtain 14 extending down inside the base receptacle.

Figure 7:
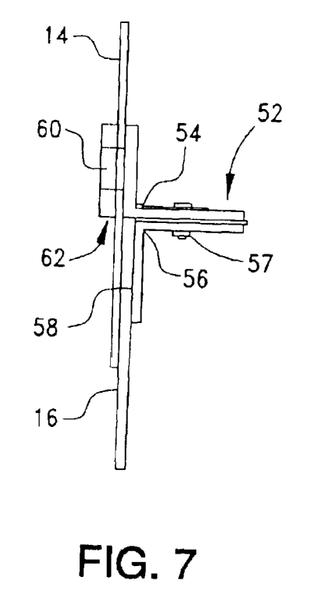
FIG. 7 is a section on the line 7—7 of FIG. 8 showing details of sealing the curtain to the inside of the base receptacle.
Figures 8, 9:
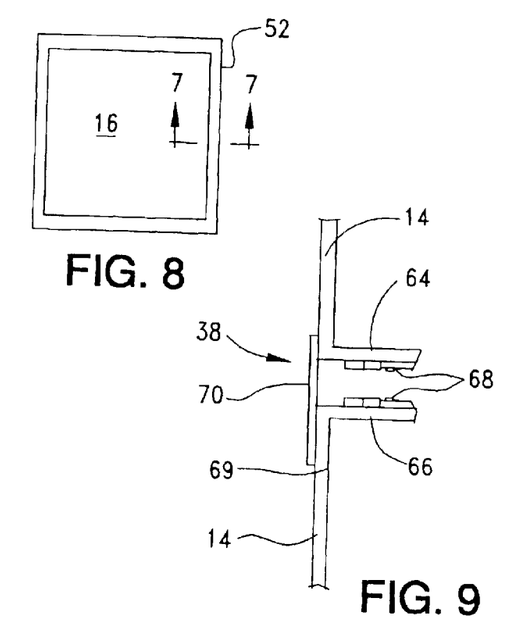
FIG. 8 is a simplified plan view of the base container of FIGS. 6 and 7.
FIG. 9 is a diagrammatic plan view of an openable vertical connection in the curtain of FIGS. 3 and 5.

FIG. 7 is a fragmentary section illustrating the sealing of the bottom of the curtain 14 to the inside of the base receptacle 16. FIG. 8 is a plan view of the top of the base receptacle showing a flange 52 around the outside of the base receptacle 16. FIG. 7 is a section on the line 7—7 of FIG. 8 showing the outside flange 52 formed by two right angle steel bars 54, 56 bolted together at 57. The lower bar 56 is welded to an outside upper lip 58 of the base receptacle 16, and the upper bar 54 is bolted to a flat bar 60 on the inside of the curtain 14, the curtain being sealingly clamped therebetween. In this way, a both water and air tight joint 62 is formed between the bottom of the curtain and the inside of the base receptacle. Adhesive may be used between all mating surfaces and, in addition, a gasket may be sandwiched between the two right angle bars 54, 56 to further ensure the tightness of this joint.

FIG. 9 illustrates a way to make each releasable vertical connection 38 water tight and substantially air tight. At each connection 38, the adjacent edges of the curtain 14 have right angle flanges 64, 66. The facing sides of these flanges 64, 66 each carry a complementary strip 68 of VELCRO or the like, these flanges and strips extending the full vertical length of each curtain edge. On the inside of one curtain edge is welded at 69 a vertical sealing strip 70 of plastic material, e.g. PVC, this strip overlapping the other vertical curtain edge in a sliding and sealing relationship. When the two right angle flanges 64, 66 are physically brought together, the complimentary VELCRO strips 68 sealingly and securely engage, and the flap formed by the internal sealing strip 70 slides over and against the inner surface of the adjacent curtain portion 14 to seal the vertical releasable connection 38.

To assemble the curtain 14 around the biomedia 18, the curtain is first supported by placing grommets 36 over hooks 40, next the pair of VELCRO strips 46 are pushed together, then the pair of VELCRO strips 44 are connected so squeezing the gasket 48. The bottom of the curtain is next connected and sealed to the base receptacle 16. Finally, the releasable connection 38 is "zippered up" by pressing its VELCRO strips 68 together.

Figure 10:
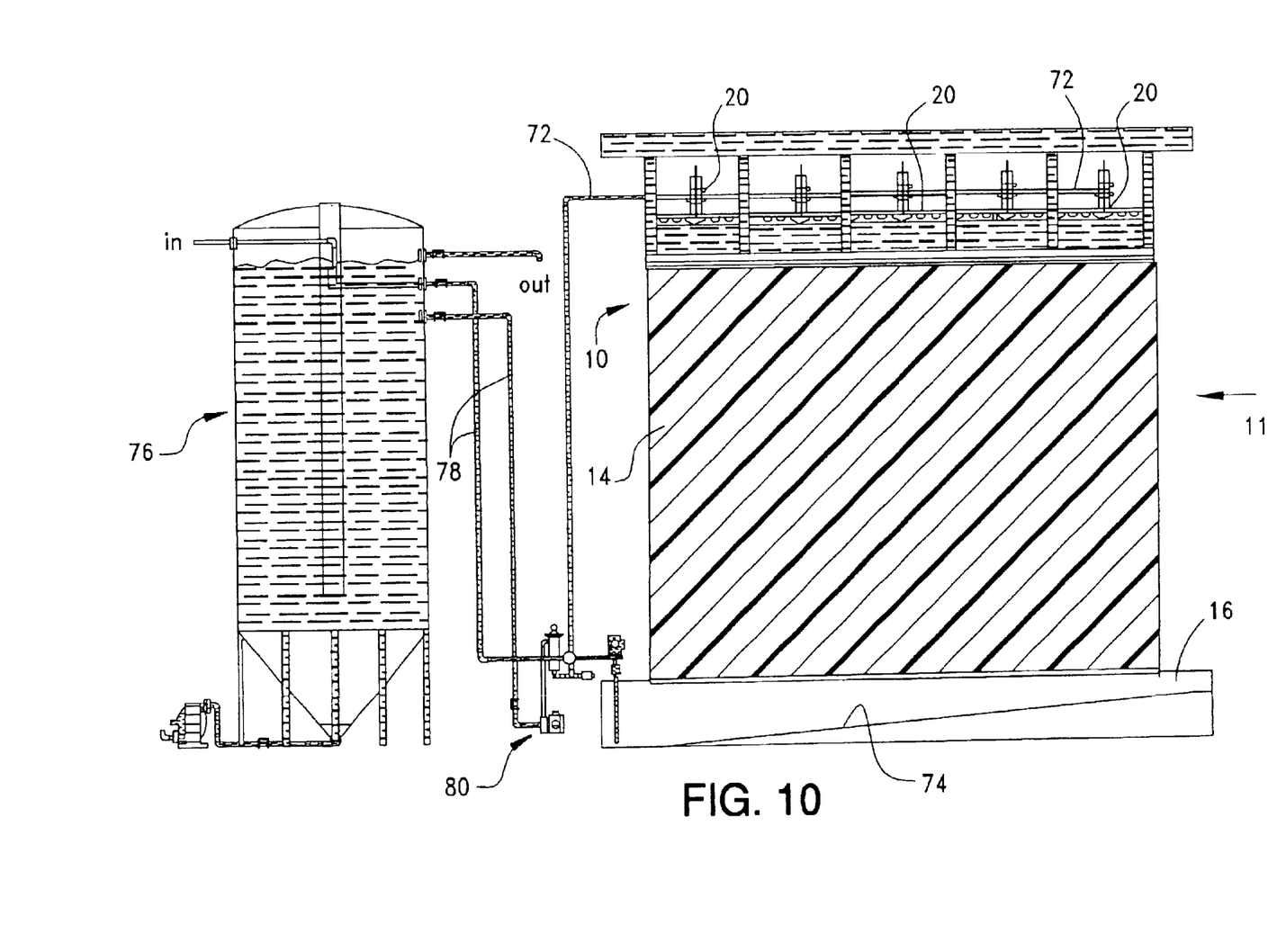
FIG. 10 is a schematic elevational view, partly in section, of another version of the apparatus of FIG. 1.

FIG. 10 illustrates in side view a variant of the apparatus of FIG. 1, and shows an elongate treatment cell 10 surrounded by a curtain 14. At the top of this cell 10 are five wastewater discharge units 20 fed by a common supply pipe 72. An elongate base receptacle 16, with a downwardly inclined floor 74, communicates with an external free-standing recirculation tank 76, and the units 20, via pipes 78 and a pump system 80, which effects recirculation of the wastewater through the cell 10.

Figure 11:
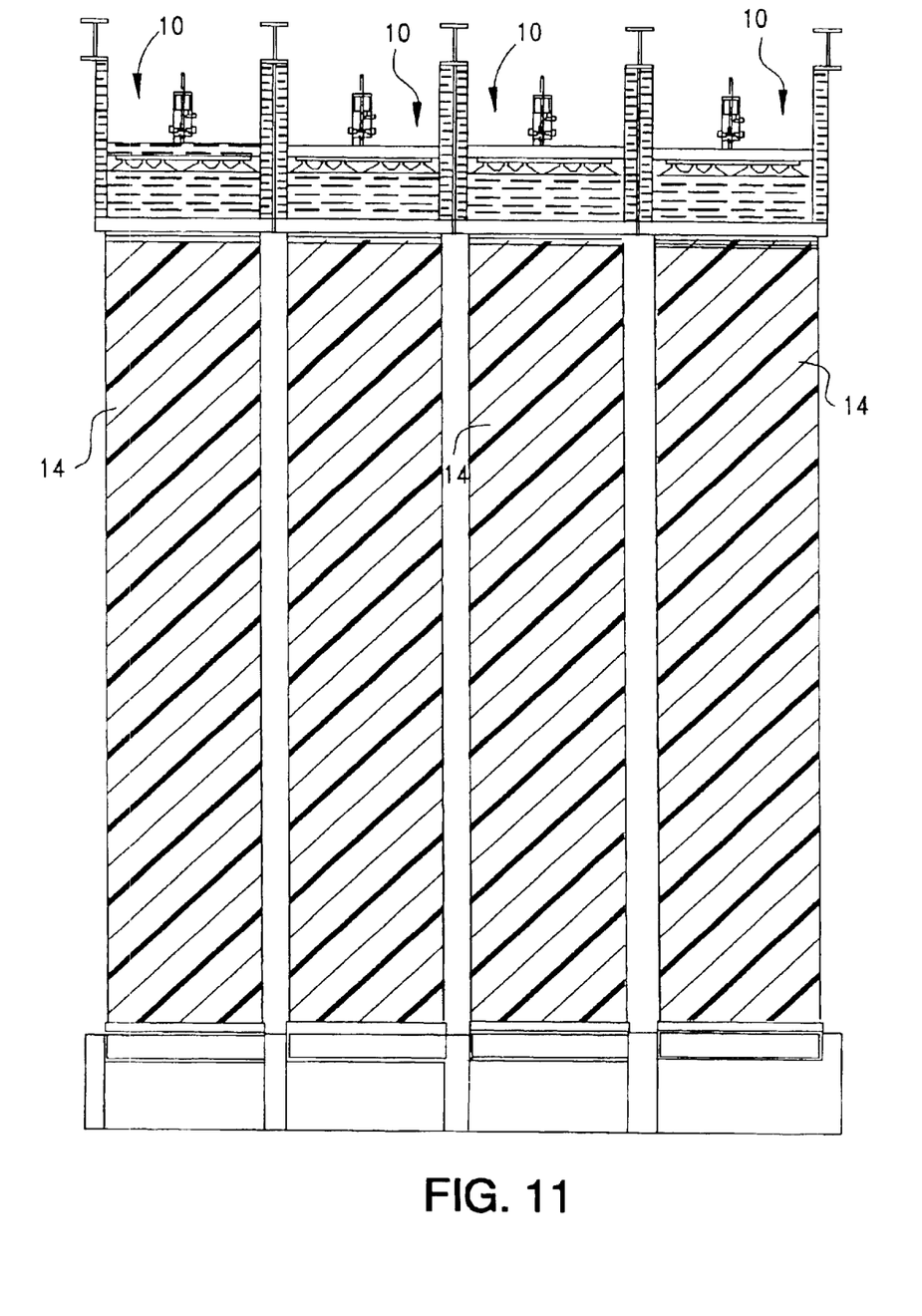
FIG. 11 is a schematic elevational view in the direction of the arrow 11 in FIG. 10.

FIG. 11 is an end view of the apparatus of FIG. 10, and shows four similar treatment cells 10 side by side. Each of these cells 10, and the biomedia therein, is surrounded and contained by a separate curtain 14. By viewing FIG. 11 in conjunction with FIG. 10, it will be realized that each cell 10 has an elongated rectangular horizontal cross-section.

When the horizontal cross-section of a cell is circular, a rotating spray arm, such as shown and described in previously referenced U.S. Pat. No. 6,241,889, would be satisfactory. However, with non-circular horizontal cross-sections, for instance square, oval, and rectangular cross-sections, a circular spray pattern may leave corner and/or end sections starved of sprayed wastewater. To overcome this, stationary spray nozzles may additionally be placed in the corners, or any other area missed by the circular spray pattern. These stationary nozzles preferably should be given a pulsing action to provide the sprayed biomedia with an opportunity to receive alternately wastewater and air. Alternately, an oscillating spray system could be employed, preferably oscillating about a horizontal axis extending along the longer dimension of the cross-section.

Figure 12:
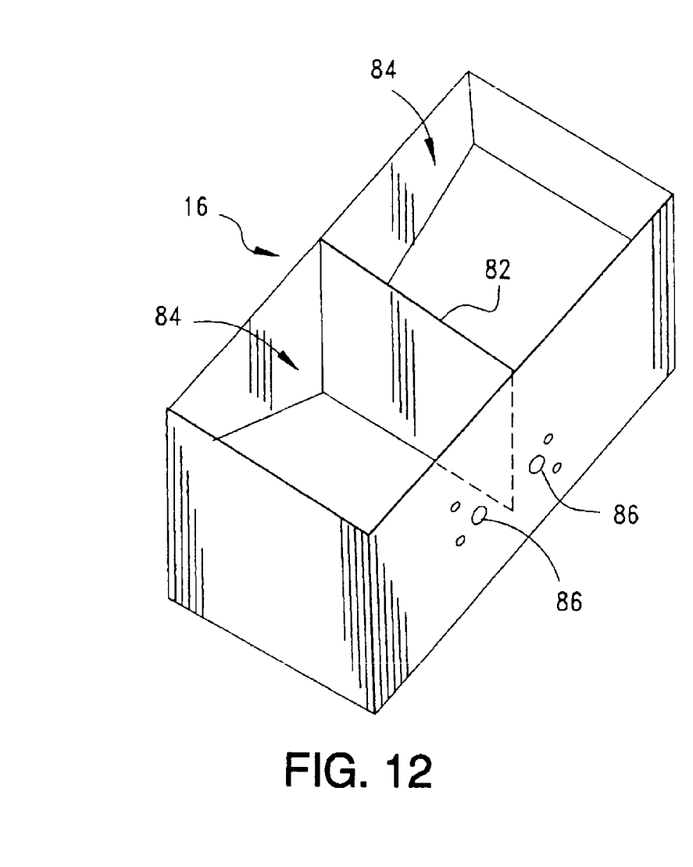
FIG. 12 is a diagrammatic perspective view of a base container partitioned for use with two cells to be surrounded by a common curtain.

FIG. 12 illustrates a base receptacle 16 for use with two treatment cells contained in a common surrounding curtain 14. A partition 82 in the base receptacle 16 divides it into two separate drip trays 84, each with its own set of outlet ports 86. Each cell would be of square cross-section, whereas the single curtain wall would be of elongate rectangular cross-section.

The above illustrates how the flexible curtain can be used to accommodate a variety of different shapes and arrangements. It does so in a way that is easy and inexpensive to install, relatively inexpensive to manufacture, facilitates inspection of and access to the biomedia, and offers flexibility for different installation configurations. Further, these curtains are virtually maintenance free.

Figure 13:
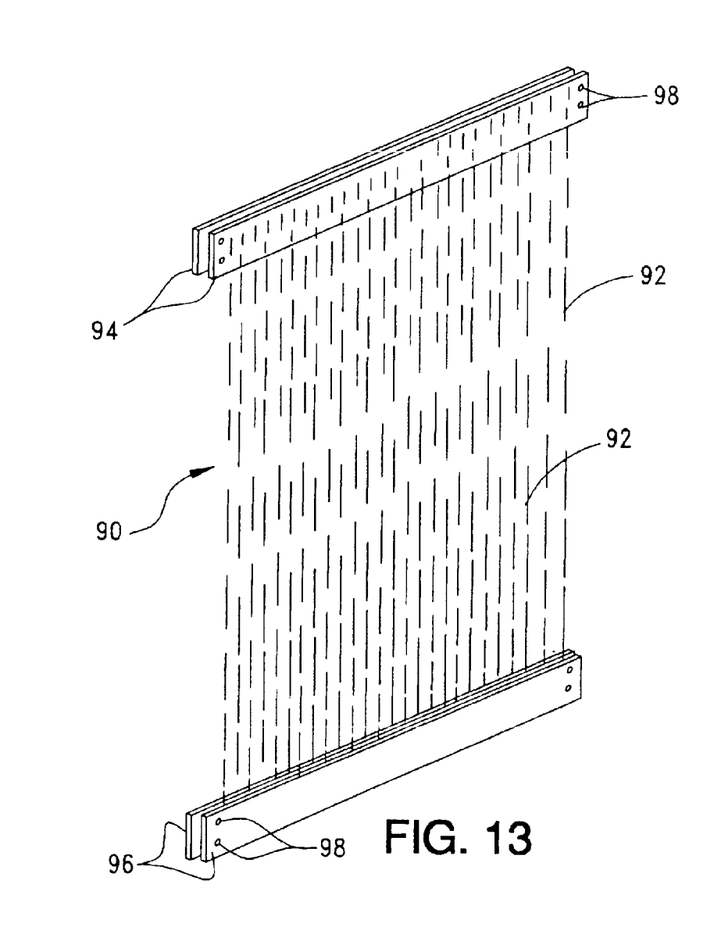
FIG. 13 is a diagrammatic perspective view of a biomedia hanger frame used according to the invention in the apparatuses of FIG. 1 and FIG. 10.

FIG. 13 illustrates a frame or hanger 90 of looped cord biomedia. The hanger frame 90 has a plurality of discrete lengths 92 of looped cord biomedia extending between upper and lower pairs 94, 96 of hanger bars. The ends of the looped cord 92 are clamped between the respective pairs of bars. The pairs of bars are secured together by gluing, although this could be done by spot welding, the bars preferably being made of plastic material, for example ABS. Each end of each pair of bars has a pair of vertically spaced apart holes 98 for assembling a plurality of hangers together. When the pairs 94, 96 of bars are stretched apart, the lengths 92 of looped cord are spaced apart parallel to each other. The ends of the lengths of looped cord may be cut off flush with the adjacent pair of clamping bars, or may extend just beyond the bars. In the latter case, these extending ends may be heat-treated to cause them to fuse and form-enlarged ends to more securely retain the ends from pulling through between the pair of clamping bars.

These hangers are preferably manufactured as a series of links connected together and rolled up into a somewhat cylindrical roll. This is done by forming a warp of strands of looped cord biomedia and clamping a pair of hanger bars across this warp. The warp is then advanced the desired length for the hanger, and another pair of hanger bars clamped across the warp. Thereafter, the warp is advanced a short distance (e.g. 1 to 4 inches) and another pair of hanger bars (to form the beginning of the next hanger) clamped across the warp. This process continues with the hangers being reeled onto a spool as further hangers are formed. Individual hangers can be then cut from the spool as required. If the cutting is performed by a hot-air knife, the cut ends of the looped cord biomedia fuse as mentioned above.

The looped cord biomedia is preferably made from knitted polyester or PVDC yarns. If the knitted structure enables the loops to be orientated in one axial direction, then in the biomedia grate, all such loops should be orientated in the same direction. This is enabled by having discrete cut lengths of biomedia formed from a warp. When assembled in a trickle tower, all such loops would be orientated upwards.

Figure 14:
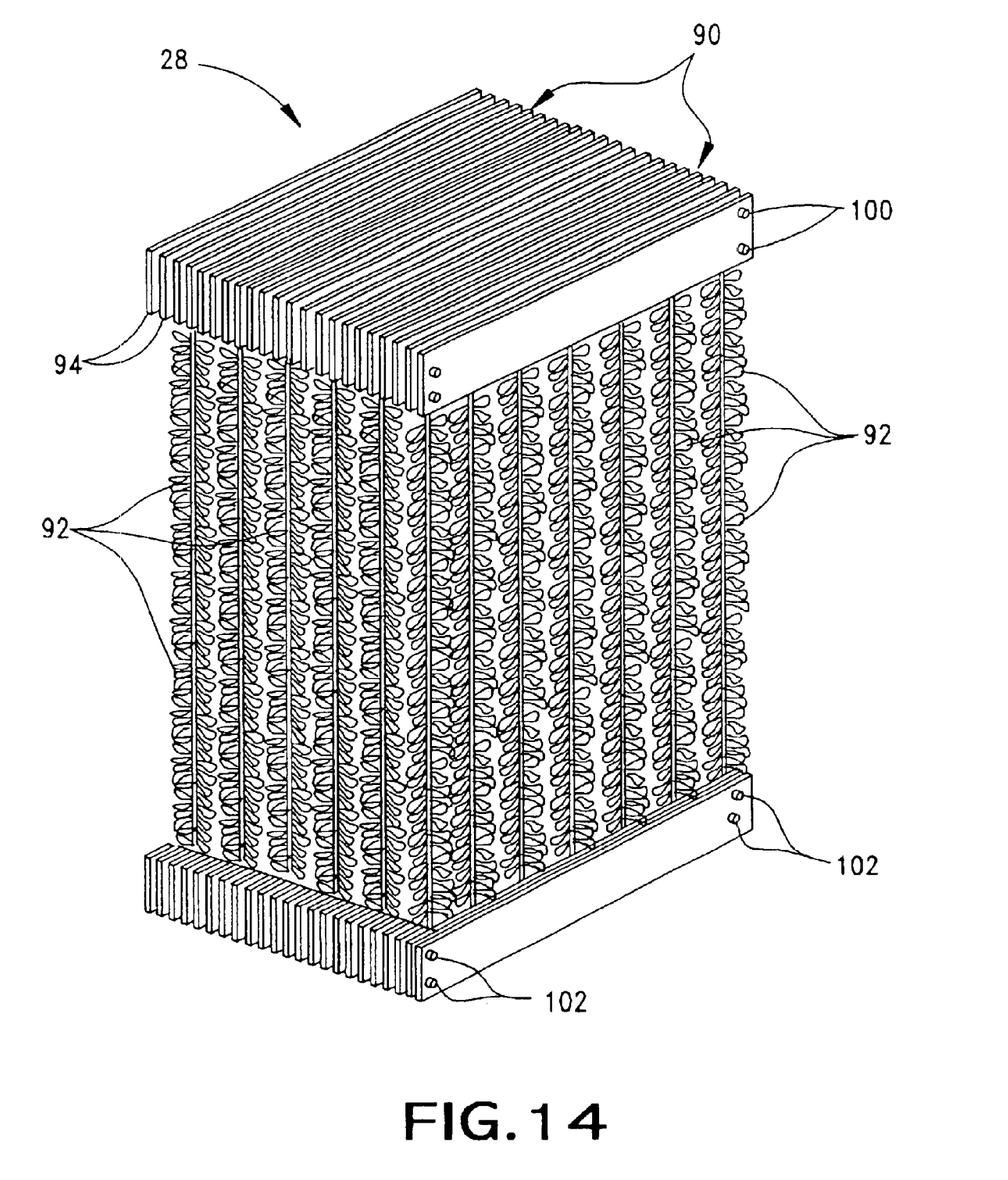
FIG. 14 is a diagrammatic simplified perspective view of a biomedia grate, according to the invention, made up of a plurality of the hanger frames of FIG. 13.

FIG. 14 shows a plurality of hanger frames 90 connected together to form a grate 28. The upper pairs of hanger clamping bars 94 are rigidly bolted together by a pair of bolts 100 at each end through the holes previously mentioned. The lower pairs of hanger clamping bars 96 are similarly rigidly bolted together by bolts 102. Spacers keep the pairs of bars correctly spaced apart.

Figures 15, 16, 17:
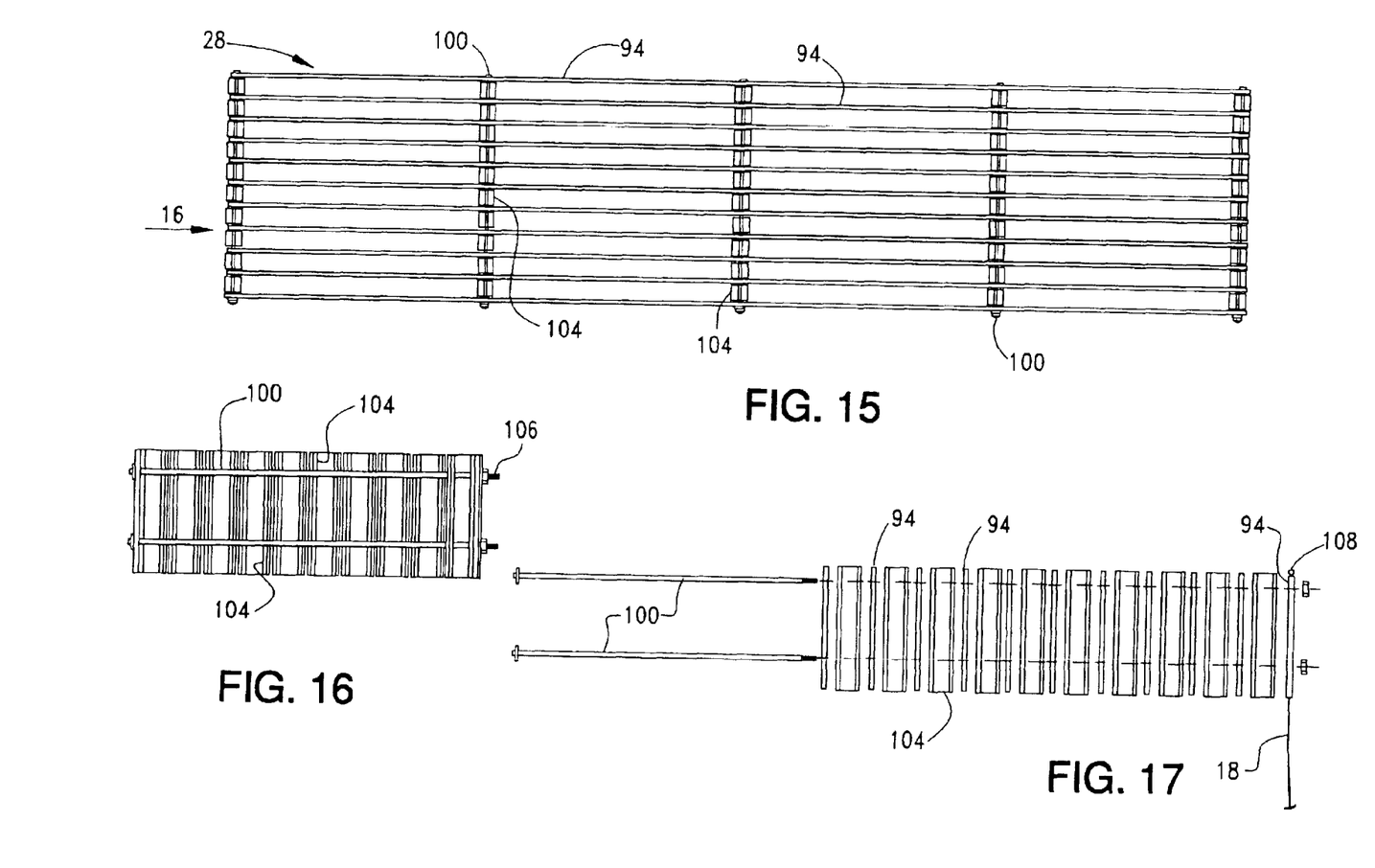
FIG. 15 is a plan view of the biomedia grate of FIG. 14.
FIG. 16 is an end view of the upper structure of the biomedia grate in the direction of the arrow 16 in FIG. 15.
FIG. 17 is an exploded view of FIG. 16 additionally showing a portion of a strand of biomedia.

FIG. 15 shows in plan view the top of the grate 28, although the pairs 94 of hanger bars are relatively longer than in FIG. 14. Eleven pairs of hanger bars are equally space apart by spacers 104 cut from square aluminum tubing. With this longer grate 28, five pairs 100 of equally spaced-apart bolts pass through the bars and the spacers. In this way, the upper pairs 94 of bars are rigidly secured together; the lower pairs of bars of this grate are similarly rigidly secured together.

FIG. 16 is an end view of the upper hanger bars of the grate in the direction of the arrow 16 in FIG. 15 (the lower hanger bars would look the same). The connecting and securing bolts 100 are tightened by their nuts 106 at the right end in FIG. 16. The hollow spacer tubes 104 extend vertically between the pairs of clamping bars for the full height thereof. FIG. 17 is an exploded view of FIG. 16, but also showing a strand 18 of looped cord biomedia 18 clamped between the right outermost pair of clamping bars and extending downwardly therefrom; the upper cut end 108 of the strand 18 can be seen extending slightly above the hanger bars. Although the strands of biomedia are clamped between the pairs of clamping bars before these are assembled into a grate, the subsequent tightening of the grate bolts 100 further aids the securing of the biomedia ends. This improves the integrity of the grate 28, and enables the biomedia strands to be able to carry heavier weights of biomass, during operation when purifying wastewater, without the biomass loaded strands tending to pull through the upper clamping bars.

Figure 18:
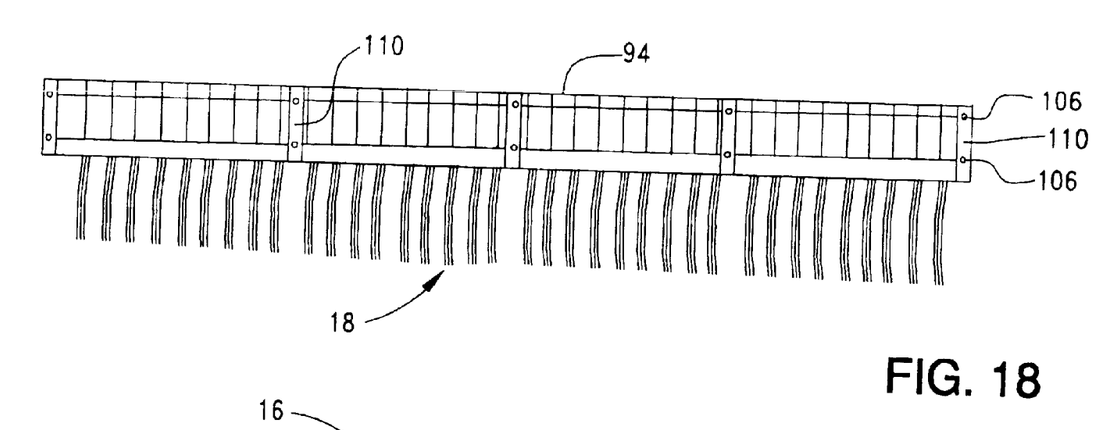
FIG. 18 is a side view of a modification of the grate of FIG. 15 showing the upper portions of the biomedia strands extending downwardly from the upper structure of the grate.

FIG. 18 shows an elevational view of the grate of FIG. 15 with the beginning of the strands of biomedia 18 extending down from the upper bars 94. A modification is also shown in the form of reinforcing anchor strips 110 between the nuts 106 and the outer plastic hanger bar.

Figure 19:
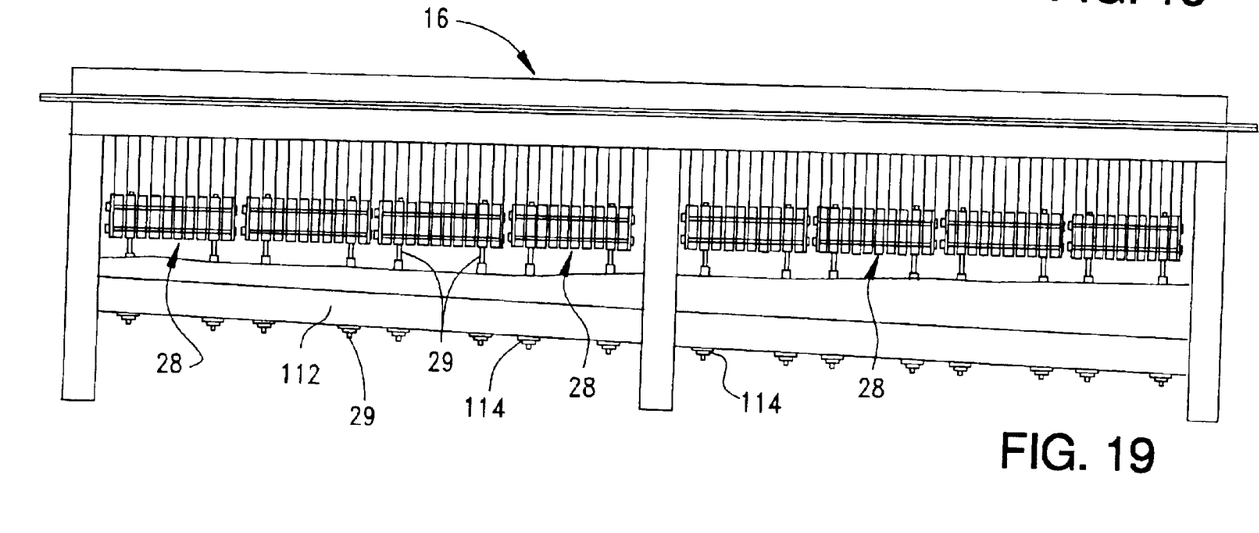
FIG. 19 is a simplified elevational view of a base receptacle for the apparatus of FIG. 1 showing the lower portions of eight biomedia grates anchored to the bottom of the receptacle.

FIG. 19 is a view similar to the bottom portion of FIG. 2, but showing the lower anchoring and tensioning bolts 29 for the multiple grates 28 passing through the bottom 112 of the tank 16. Also, this base tank 16 is of double width to function as a common tank for two side-by-side treatment cells, each cell having four grates 28. When the through bolts 29 are tensioned by adjusting their nuts 114 underneath the raised bottom 112 of the tank, the lengths of looped cord biomedia (or any other biomedia strands employed) are tensioned and kept in spaced-apart parallel vertical alignment. The bolts 29 slidingly pass through tubes extending through and sealed to the bottom 112 of the base tank 16, these tubes extending upwardly to above the level of the wastewater in the base tank 16, as shown. This enables the lower ends of the biomedia grates to move downwardly slightly, should the biomedia stretch under the weight of the biomass forming on it during processing of the wastewater.

Figure 20:
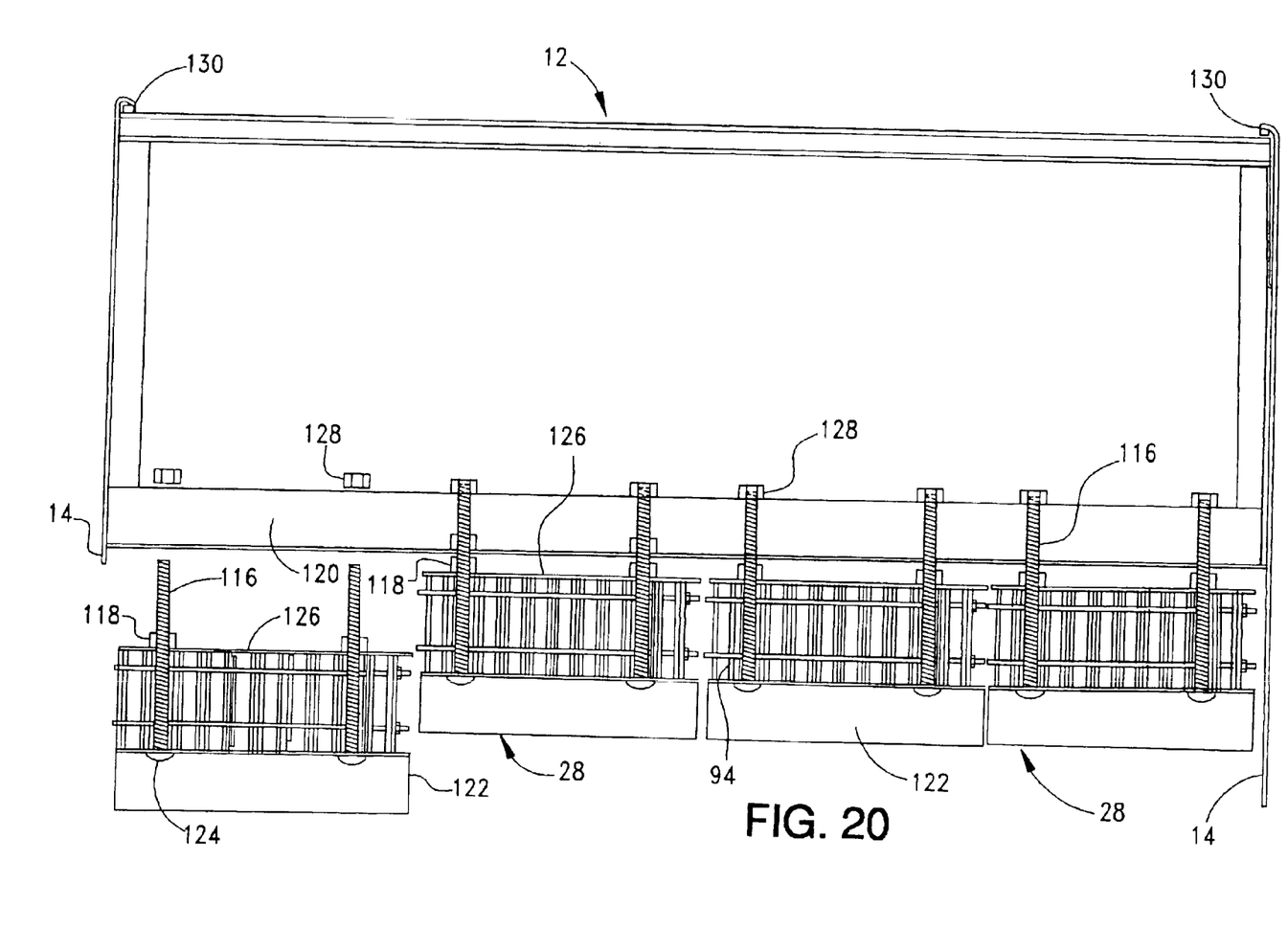
FIG. 20 is simplified vertical section of an upper part of the apparatus of FIG. 1 modified and showing the suspension of the upper ends of four biomedia grates, the left most one in partially exploded view.

FIG. 20 shows in greater detail the mounting of the upper ends of the grates 28 to the hood 12 at the top of each cell. Round-headed suspension bolts 116, extending upwardly between adjacent pairs 94 of hanger bars, are locked in place by clamping nuts 118, and then pass upwardly through a cross beam 120 attached to the hood structure 12. Individual lengths of angle bars 122 are disposed under the upper pairs 94 of clamping bars between the round bolt heads 124 and the lower edges of the clamping bars. Individual lengths of flat stock 126 are disposed between the upper edges of the clamping bars and the clamping nuts 118. By adjusting tensioning nuts 128 of the suspension bolts 116, the elevation of the grates 28, and also the tension of the biomedia strands, can be adjusted. The leftmost grate is shown just before mounting to the hood. Another way of mounting the upper end of the curtain 14 on the hood is shown. The curtain 14 extends the full height of the hood 12, with the upper edge 130 of the curtain being hooked-shaped and hooked over the top of the hood. This hooked upper curtain edge 130 slidingly engages a rail running around the top of the hood.

It will be appreciated, that not only does the curtain arrangement enable flexibility and economy in designing and building wastewater trickle towers, but the biomedia grate of the present invention adds further flexibility and economy. The collapsible version of the grates can readily be collapsed and packed in a shipping box for shipping and storage. When needed for service, they are simply lifted out of the box and their upper ends readily secured to the hoods; thereafter, the lower ends can readily be installed in the base receptacles. Any needed separation of the biomedia strands can easily be accomplished through the openable accesses in the curtains. Thereafter, the lengths of biomedia strands can readily be correctly tensioned.

It will be appreciated, that the construction of the grates and the manner of readily adjusting the tension of the biomedia strands, reduces any tendency of the strands to sway towards each other in use, so mitigating biomass bridging between strands. This risk is even further reduced by the feature of enabling the lower hanger bars to be downwardly movable.

It will also be realized, that the sealing of the curtain at the top and bottom of the cells enables the air or other gas content in the cells to be more accurately controlled, thereby improving operating conditions. The same applies to the sealed arrangement obtained by sealingly stacking the wastewater discharge unit, the self-supporting filter units, and the base receptacle unit.

The above described embodiments, of course, are not to be construed as limiting the breadth of the present invention. Modifications, and other alternative constructions, will be apparent which are within the spirit and scope of the invention as defined in the appended claims.

What is claimed is:

1. A wastewater treatment apparatus, comprising:
   a support structure;
   a trickle tower supported by said support structure and containing biomedia;
   said biomedia being in the form of at least one grate comprising a plurality of hanger frames;
   each hanger frame comprising a row of vertically extending biomedia strands, a pair of mutually connected upper bars, and a pair of mutually connected lower bars, upper ends of the strands of the row being clamped between the pair of upper bars, and lower ends of these strands being clamped between the pair of lower bars;
   the upper bars of said grate being connected together, the lower bars of said grate being connected together, and the respective rows of strands being spaced apart; and
   said upper bars being suspended from said support structure and said lower bars being anchored below said upper bars with the rows of strands being tensioned between said upper and lower bars.

2. The wastewater treatment apparatus of claim 1, comprising a receptacle below said grate for receiving wastewater falling from said strands, said lower bars being anchored to said receptacle.

3. The wastewater treatment apparatus of claim 1, wherein said strands are each formed as a discrete cut length.

4. The wastewater treatment apparatus of claim 1, wherein said strands comprise lengths of looped cord.

5. The wastewater treatment apparatus of claim 4, wherein said looped cord has at least some loops which are orientated in one direction along the looped cord, and the strands are orientated with said at least some loops all orientated in the same direction.

6. The wastewater treatment apparatus of claim 5, wherein said same direction is upwardly, opposite to the fall of wastewater down said trickle tower.

7. The wastewater treatment apparatus of claim 2, wherein said anchoring is effected by tensioning bolts with adjustable nuts for tensioning said biomedia strands.

8. The wastewater treatment apparatus of claim 1, wherein spacing elements are disposed between adjacent pairs of bars, the upper pairs of bars and the spacing elements therebetween are clamped together, and the lower pairs of bars and the spacing elements therebetween are separately clamped together.

9. The wastewater treatment apparatus of claim 8, wherein at least one bolt clamps all the upper pairs of bars together, and at least one bolt clamps all the lower pairs of bars together.

10. The wastewater treatment apparatus of claim 1, further comprising a sleeve surrounding said grate, said sleeve having a rectangular horizontal cross-section and comprising flexible sheeting suspended from said support structure.

11. The wastewater treatment apparatus of claim 1, wherein a second grate is positioned adjacent but spaced horizontally from said at least one grate, and a common receptacle for wastewater falling from said grates is disposed below both grates.

12. The wastewater treatment apparatus of claim 11, further comprising a flexible sheet sleeve suspended from said support structure and surrounding both grates.

13. A biomedia filter unit for incorporation in a trickle tower wastewater treatment apparatus, said filter unit comprising:
   a grate comprising a plurality of hanger frames, each hanger frame comprising a row of spaced-apart biomedia strands;
   each frame further comprising a pair of mutually connected upper bars and a pair of mutually connected lower bars, upper ends of the strands of a respective row being clamped between the upper bars and lower ends of these strands being clamped between the lower bars; and
   the rows of biomedia strands being spaced apart with the upper bars of the grate being connected together and the lower bars of the grate being connected together.

14. The biomedia filter unit of claim 13, wherein said strands comprise discrete lengths of looped cord biomedia whereby each strand is separate from the next strand.

15. The biomedia filter unit of claim 14, wherein said looped cord biomedia has loops at least some of which are orientated in one direction, and all the lengths of looped cord biomedia are disposed with all said at least some loops orientated in the same direction.

16. The biomedia filter unit of claim 13, wherein said bars are made of plastic material, and the bars of each said pair are glued together.

17. The biomedia filter unit of claim 13, further comprising spacers disposed between adjacent pairs of bars spacing said pairs apart.

18. The biomedia filter unit of claim 13, wherein each said strand has terminal ends, said terminal ends being enlarged due to having been melted.

19. The biomedia filter unit of claim 13, wherein the pairs of upper bars are rigidly connected together to form a rigid unit.

20. The biomedia filter unit of claim 13, wherein the pairs of lower bars are rigidly connected together to form a rigid unit.

21. A wastewater trickle tower apparatus, comprising:
   at least one biomedia grate comprising upper hanger bars, lower hanger bars, and spaced-apart rows of looped cord biomedia strands connecting said upper and lower hanger bars;
   upper ends of said strands being secured by said upper hanger bars, and lower ends of said strands being secured by said lower hanger bars;

a base receptacle below said grate;

said upper hanger bars being secured together as a unit;

said lower hanger bars being secured together as a unit; and at least one adjustable member slidably mounted relative to the receptable for drawing one of said lower or upper hanger bar units away from the other.

22. The apparatus of claim 21, wherein said at least one adjustable member is operable between said lower hanger bar unit and said receptacle to draw said lower hanger bar unit towards said receptacle.

23. The apparatus of claim 21, wherein said adjustable member is slidably mounted relative to said receptacle to allow said adjustable member to move automatically to accommodate any lengthening of said strands in use due to biomass forming thereon.

* * * * *